(12) United States Patent
Li et al.

(10) Patent No.: US 9,890,077 B2
(45) Date of Patent: Feb. 13, 2018

(54) GLASS PANE BOMBARDMENT DEGASSING DEVICE

(71) Applicant: LUOYANG LANDGLASS TECHNOLOGY CO., LTD., Henan (CN)

(72) Inventors: Yanbing Li, Henan (CN); Zhangsheng Wang, Henan (CN); Shitao Pang, Henan (CN); Haiyan Wu, Henan (CN)

(73) Assignee: LUOYANG LANDGLASS TECHNOLOGY CO., LTD., Henan (CN)

( * ) Notice: Subject to any disclaimer, the term of this patent is extended or adjusted under 35 U.S.C. 154(b) by 41 days.

(21) Appl. No.: 14/906,778

(22) PCT Filed: Jan. 6, 2014

(86) PCT No.: PCT/CN2014/070170
§ 371 (c)(1),
(2) Date: Jan. 21, 2016

(87) PCT Pub. No.: WO2015/021747
PCT Pub. Date: Feb. 19, 2015

(65) Prior Publication Data
US 2016/0152519 A1    Jun. 2, 2016

(30) Foreign Application Priority Data

Aug. 12, 2013    (CN) .......................... 2013 1 0347904

(51) Int. Cl.
*C03C 23/00*    (2006.01)
*H01J 37/30*    (2006.01)
*E06B 3/677*    (2006.01)

(52) U.S. Cl.
CPC .......... *C03C 23/005* (2013.01); *C03C 23/004* (2013.01); *E06B 3/6775* (2013.01)

(58) Field of Classification Search
CPC    H01J 21/20; H01J 21/22; A61L 2/087; C03C 23/004; E06B 3/677
(Continued)

(56) References Cited

U.S. PATENT DOCUMENTS

| 5,876,260 A | 3/1999 | Pepi et al. |
| 2012/0107465 A1 * | 5/2012 | Nguyen ................... A23L 3/26 426/240 |
| 2013/0061872 A1 * | 3/2013 | Goto ..................... C23C 14/022 134/1.1 |

FOREIGN PATENT DOCUMENTS

| JP | 2011252193 A | 12/2011 |
| WO | WO 2012/103741 A1 | 8/2012 |

OTHER PUBLICATIONS

International Search Report from the State Intellectual Property Office of the P.R. China for International Application No. PCT/CN2014/070170 dated May 9, 2014.

(Continued)

*Primary Examiner* — Wyatt Stoffa
*Assistant Examiner* — Eliza Osenbaugh-Stewart
(74) *Attorney, Agent, or Firm* — Finnegan, Henderson, Farabow, Garrett & Dunner, LLP

(57) ABSTRACT

This application discloses a glass pane bombardment degassing device. The glass pane bombardment degassing device comprises a vacuum box body, a glass pane carrying device, an inlet and an outlet arranged on the vacuum box body for the glass pane carrying device to enter or exit the body, a bottom plate arranged on the glass pane carrying device to stack a plurality of glass panes stacked, every two adjacent glass panes being separated from each other, and a bombardment device placed inside the vacuum box body. The bombardment device includes a first and a second electrodes arranged in an up-and-down opposite way and connected with a positive electrode of a power supply, a moving (Continued)

electrode arranged between the first and second electrodes and connected with a negative electrode of the power supply, to generate ion or electron streams performing bombardment degassing to glass panes.

20 Claims, 4 Drawing Sheets

(58) Field of Classification Search
USPC .................................................. 250/492.3
See application file for complete search history.

(56) References Cited

OTHER PUBLICATIONS

Patent Examination Report No. 1. issued in Australian Patent Application No. 2014308451, dated May 23, 2016, 2 pages.
Examination Report issued in Canadian Patent Application No. 2,920,693, dated Mar. 6, 2017, 5 pages.
Search Report issued in Chinese Patent Application No. 201310347904.7, dated Feb. 18, 2016, 1 page.
Extended European Search Report issued in European Patent Application No. 14836104.1, dated May 2, 2016, 7 pages.

* cited by examiner

GLASS PANE BOMBARDMENT DEGASSING DEVICE

CLAIM FOR PRIORITY

This application is a U.S. national phase entry under 35 U.S.C. § 371 from PCT International Application No. PCT/CN2014/070170 filed on Jan. 6, 2014, which is based upon and claims the benefit of priority from the prior Chinese Patent Application No. 201310347904.7, filed on Aug. 12, 2013. The entire contents of the above applications are incorporated herein by reference.

TECHNICAL FIELD

The present invention relates to a bombardment degassing device, which is used for degassing the surface of a glass pane when a vacuum glass is manufactured, in particular to an electron or ion bombardment degassing device.

BACKGROUND TECHNOLOGY

Compared with a single-layer glass pane or a insulating glass, a vacuum glass formed by a plurality of glass panes has better sound insulating and heat insulating properties, as a vacuum interlayer is arranged between the adjacent glass panes of the vacuum glass.

After the manufacturing of the vacuum glass, as time going on, the sound and heat insulating effects are gradually degraded. The reason for that is vacuum degree degradation of the vacuum interlayers in the vacuum glass. Through further intensive study and a large amount of experiments, the applicant has found that, in addition to such factors as unreliable sealing at sealing edges, deflation of sealing materials and deflation of middle support materials, she deflation of a glass pane surface is also one of the important factors for vacuum degree degradation of the vacuum interlayers, moreover, gas molecules adsorbed on the surface of a glass pane can neither escape immediately from a vacuum environment in which the vacuum glass is manufactured, and nor to be removed by simple cleaning before the vacuum glass is sealed.

INVENTION CONTENTS

Aiming to solve the existing problems in the above mentioned technology the objective of the invention is to provide a glass pane electron or ion bombardment degassing device which can be used to remove the gas molecules adsorbed on the surface of a glass pane before the vacuum glass is sealed, in order to avoid vacuum degree degradation of vacuum interlayers caused by the escaping of the gas molecules after the vacuum glass is sealed.

To achieve the aforementioned objective, the glass pane bombardment degassing device in the present invention comprises a vacuum box body and a glass pane carrying device, the inlet and outlet of the glass pane carrying device are arranged on the vacuum box body a bottom plate capable of performing electrical conduction is arranged on the glass pane earning device, a plurality of glass panes are stacked above the bottom plate, and every two adjacent stacked glass panes are separated from each other via a spacer, and a conveyance mechanism, a lifting mechanism and a bombardment device are arranged inside the vacuum box body, wherein the conveyance mechanism is used for conveying the glass pane carrying device into and out of the vacuum box body; the bombardment device comprises a power supply a first electrode a second electrode and a moving electrode, the first and second electrodes are arranged up and down in an opposite way, the moving electrode is movably arranged between the first and second electrodes, the moving electrode is connected with the negative electrode of the power supply, the first and second electrodes are connected with the positive electrode of the power supply thus ion or electron streams are generated between the moving electrode and the first electrode as well as between the moving electrode and the second electrode respectively, in order to perform bombardment degassing on the lower surface of the glass pane located between the moving electrode and the first electrode and on the upper surface of the glass pane located between the moving electrode and the second electrode, and the ion or electron streams are caused to sweep across the entire surface of the glass pane by the movement of the moving electrode, so as to achieve degassing of the entire surface strip shaped working planes which are matched with the first and second electrodes respectively, are arranged on the moving electrode, the strip-shaped working planes form ribbon-shaped ion or electron streams throughout the full length of the strip-shaped working planes during working, the first electrode is arranged in the vacuum box body, the working plane of the first electrode is a plane compatible with the to-be-degassed surface of the glass pane or a strip-shaped plane matched with and moving along with the moving electrode, the second electrode is formed by the bottom plate on the glass pane carrying device, correspondingly, a conductive tip for electrically connecting the bottom plate with the positive electrode of the power supply is arranged inside the vacuum box body, and the conductive tip is formed by a conductive brush which is in sliding connection with an electrical connection plate arranged on the glass pane carrying device, or by a telescopic connection tip; and the lifting mechanism is used for lifting the upper one of the two adjacent glass panes stacked on the glass pane carrying device to the position between the moving electrode and the first electrode of the bombardment device, in order to perform bombardment degassing on the lower surface of the upper glass pane and at this moment, the lower one of the two adjacent glass panes is located between the moving electrode and the second electrode of the bombardment device.

Further, the power supply is a direct current power supply or a high-voltage pulse power supply, or the like.

Further the plurality of glass panes are at least two glass substrates forming a multi-chamber vacuum glass.

Further the plurality of glass panes are two glass panes.

Further, the conveyance mechanism is formed by a roller conveyor, and the glass pane carrying device is provided with a base and is supported on the roller way of the conveyor via the base thereof.

Further, the inlet and the outlet of the glass pane carrying device arranged on the vacuum box body include an inlet and an outlet which are located at the ends of the roller conveyor respectively.

Further, the base of the glass pane carrying device is directly formed by the bottom plate thereon.

Further, the first electrode is formed by a flat plate.

Further, the bottom plate on the glass pane carrying device is formed by a flat plate.

Further, the working planes on the moving electrode, which are matched with the first and second electrodes respectively, are both strip-shaped planes.

Further, the moving electrode is formed by a bracket, which has an H-shaped cross section, and two strips, which are horizontally placed on the two surfaces, i.e. the upside surface and the downside surface, of the middle web plate of the H-shaped bracket respectively and have a cross section in the shape of round, rectangle, triangle, square or other polygons, wherein the H-shaped bracket is made of an insulating material, therefore an upper electrode and a lower electrode mutually insulated are formed on the H-shaped bracket.

Further, there are two sets of power supplies, the strip located above the middle web plate of the H-shaped bracket and the first electrode are connected with the negative electrode and positive electrode of one set of the power supplies respectively, the strip located below the middle web plate of the H-shaped bracket and the second electrode are connected with the negative electrode and positive electrode of the other set of power supply respectively, therefore, an upper ion or electron bombardment loop and a lower ion or electron bombardment loop, which are independent of each other and used for degassing the upper glass pane and the lower glass pane in the two adjacent glass panes respectively, are formed.

Further, there is one set of power supply, the strips above and below the middle web plate of the H-shaped bracket of the moving electrode are connected with the negative electrode of the power supply, and the first and second electrodes are connected with the positive electrode of the power supply.

Further, two grooves in which the two strips on the H-shaped bracket are located are both deep grooves, and two sidewalls of each deep groove form shielding and guidance for the ion or electron stream generated during the working of the strip in this groove.

Further, the travel distance of the moving electrode can be set according to the size of the glass, the range of bombardment degassing is within a desired area only; and the length of the moving electrode can also be adjusted or shaded as required.

Further, the H-shaped bracket is movably mounted, via sliding bases at the two ends thereof, on two guide rails arranged inside the vacuum box body, and is driven by a driving mechanism to move along the guide rails, the sliding bases and the H-shaped bracket are formed integrally or formed in a splitting way at first and then fixedly connected with each other; the driving mechanism is a motor-driven gear/rack type driving mechanism, the racks are fixedly arranged in the vacuum box body, and the gear boxes are mounted on the sliding bases and driven to rotate by the motor, or, the driving mechanism can be a motor-driven nut/screw type driving mechanism, the nuts are fixed on the sliding bases, and the serous are rotatably mounted in the vacuum box body and driven to rotate by the motor, or, the driving mechanism can be a motor-driven chain/sprocket type driving mechanism, wherein the chain is in a ring shape supported by two sprockets at the two ends, the sprocket at one end is driven to rotate by the motor, and the sliding bases are fixedly connected to the chain plate of the chain.

Further, the two guide rails extend in a direction parallel to or perpendicular to the conveyance direction of the roller conveyor, the driving mechanism of the H-shaped bracket is a motor-driven chain/sprocket type driving mechanism, a ring-shaped chain, two ends of which are supported by two sprockets, is arranged at the outer side of the two guide rails in a mirroring way, and the sprockets of the two ring-shaped chains, which are located at the same side, are fixedly connected by a shaft rod and driven to rotate by the motor.

Further, the lifting mechanism is composed of lifting units which surround a glass pane to be lifted and are arranged at intervals, wherein each lifting unit comprises a sliding rail, a sliding base, a sliding base drive device, a hook and a hook drive device; the sliding rail is fixedly arranged in the vacuum box body, the sliding base is mounted on the sliding rail, a vertical guide hole is arranged on the sliding base, the hook comprises a rod body and a hook tip at the lower end of the rod body, the hook is inserted into the guide hole in such a manner that the rod body of the hook is matched with the guide hole, and the upper end of the rod body of the hook is connected with the hook drive device; the hook is driven by the hook drive device to move up and down along the guide hole, so as to lift up and put down the upper glass pane in the two adjacent glass panes, the sliding base is driven by the sliding base drive device to reciprocate along the guide rail, so as to insert the hook tip into and enable the hook tip to retreat from the gap between the two adjacent glass panes.

Further, the sliding base drive device and the hook drive device are both formed by a hydraulic cylinder or an air cylinder, the piston rod of the hydraulic cylinder or the air cylinder stretches into the vacuum box body, the body of the hydraulic cylinder or the air cylinder is air-lightly fixed on the sidewall of the vacuum box body through the end where the piston rod is located, wherein the piston rod of the hydraulic cylinder or the air cylinder serving as the hook drive device is connected with the upper end of the rod body of the hook via a chain, and correspondingly, a sprocket for supporting the chain is arranged on the sliding base.

Further, the sliding base drive device and the hook drive device are electric push rods or other electric drive devices.

Further, the piston rod of the hydraulic cylinder or the air cylinder forming the hook drive device is connected with the upper end of the rod body of the hook via a rope, and correspondingly, a pulley for supporting the rope is arranged on the sliding base.

Further, a limit platform or a limit pin is arranged on the upper end of the rod body of the hook and used for limiting the maximal falling position of the hook, and at this maximal falling position, the hook is exactly located at a height between the upper layer glass and the lower layer glass, so as to facilitate the stretching of the hook into the bottom of the lower layer glass under the driving of the sliding base drive device.

Before the sealing of the vacuum glass, the glass pane bombardment degassing device in the present invention can remove, by means of ion or electron bombardment, gas molecules which are adsorbed on the surface of a glass pane, in order to avoid vacuum degree degradation of the vacuum inter layers caused by the escape of the gas molecules after the vacuum glass is sealed, as a result, the service life of the vacuum glass is prolonged.

DETAILED DESCRIPTION

Description is made below to the present invention in conjunction with the drawings.

Embodiment 1

Figure 1:
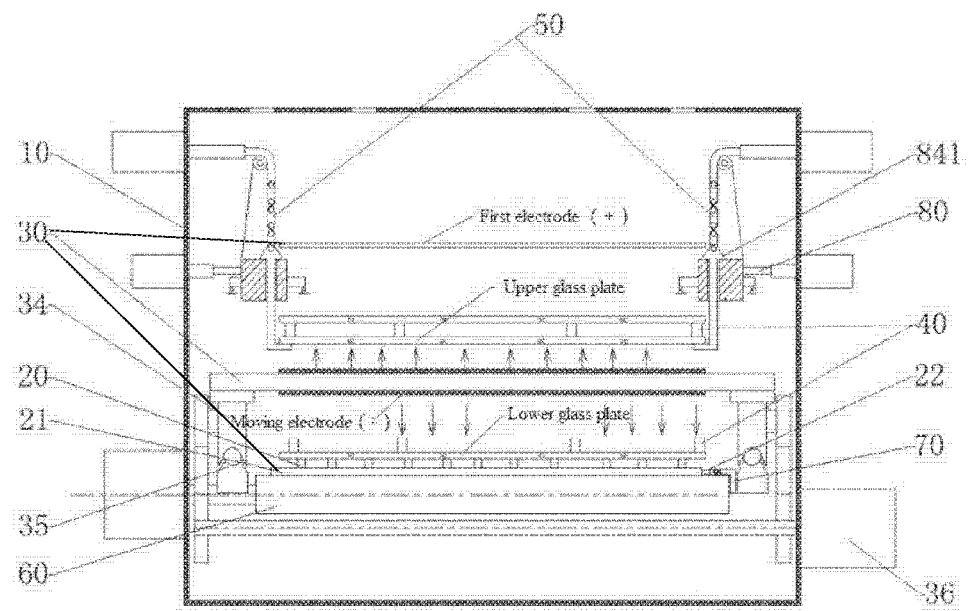
FIG. 1 is a primary schematic diagram of the structure of the glass pane bombardment degassing device in embodiment 1 of the present invention.
Figure 2:
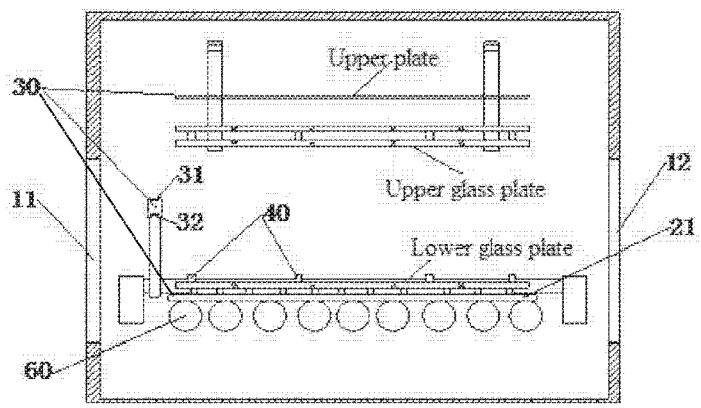
FIG. 2 is a left sectional view of the glass pane bombardment degassing device in embodiment 1.

As shown in FIG. 1 and FIG. 2, the glass pane bombardment degassing device in the present invention comprises a vacuum box body 10 and a glass pane carrying device 20, the inlet 11 and the outlet 12 of the glass pane carrying device 20 are arranged on the vacuum box body 10, a bottom plate 21 capable of performing electrical conduction is arranged on the glass pane carrying device 20, a plurality of glass panes are stacked above the bottom plate 21, and every two adjacent stacked glass panes are separated from each other via a spacer 40.

A conveyance mechanism 60, a lifting mechanism 50 and a bombardment device 30 are arranged inside the vacuum box body 10.

The conveyance mechanism 60 is used for conveying the glass pane carrying device 20 into and out of the vacuum box body 10.

The bombardment device 30 comprises a power supply (not shown in the figures), a first electrode, a second electrode and a moving electrode, wherein the first and the second electrodes are arranged up and down in an opposite way, the moving electrode is movably arranged between the first and second electrodes, the moving electrode is connected with the negative electrode of the power supply, the first and second electrodes are connected with the positive electrode of the power supply, therefore, ion or electron streams are generated between the moving electrode and the first electrode as well as between the moving electrode and the second electrode respectively, in order to perform bombardment degassing on the lower surface of the glass pane located between the moving electrode and the first electrode and on the upper surface of the glass pane located between the moving electrode and the second electrode, and the ion or electron streams are caused to sweep across the entire surface of the glass pane via the movement of the moving electrode, so as to achieve degassing of the entire surface.

A strip-shaped first working plane 31 and a strip-shaped second working plane 32, which are matched with the first and second electrodes respectively, are arranged on the moving electrode, the two strip-shaped working planes form ribbon-shaped ion or electron streams throughout the full length of the strip-shaped working planes during working, the first electrode is arranged in the vacuum box body 10, the working plane of the first electrode is a plane compatible with the to-be-degassed surface of the glass pane; the second electrode is formed by the bottom plate 21 on the glass pane carrying device 20, correspondingly, a conductive tip 70 for eclectically connecting the bottom plate 21 with the positive electrode of the power supply is arranged inside the vacuum box body 10, and the conductive tip 70 is formed by a conductive brush which is in sliding connection with an electrical connection plate 22 arranged on the glass pane carrying device 20.

The travel distance of the moving electrode can be set according to the size of the glass, the range of bombardment degassing is within a desired area only; and the length of the moving electrode can also be adjusted or shaded as required.

The lifting mechanism 50 is used for lifting the upper one of the two adjacent glass panes stacked on the glass pane carrying device 20 to the position between the moving electrode and the first electrode of the bombardment device 30, in order to perform bombardment degassing on the lower surface of the upper glass pane, and at this moment, the lower one of the two adjacent glass panes is located between the moving electrode and the second electrode (i.e. the bottom plate 21) of the bombardment device 30.

The plurality of glass panes are at least three glass substrates forming a multi-chamber vacuum glass.

The conveyance mechanism 60 is formed by a roller conveyor, the glass pane carrying device 20 is provided with a base and is supported on the roller way of the conveyor via the base thereof, and the base in this embodiment is directly formed by the bottom plate 21.

Vertical bombardment of ion or electron streams is applied to the surface of the to-be-degassed glass pane; and the first electrode is formed by a flat plate.

Figure 3A:
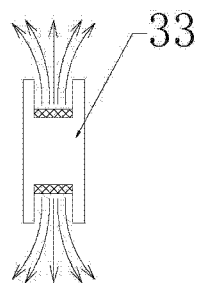
FIG. 3 is a schematic diagram of the H-shaped bracket of the moving electrode of the glass pane bombardment degassing device in embodiment 1, wherein a is an end view of the H-shaped bracket and b is a sectional view of Use H-shaped bracket in the length direction.
Figure 3B:
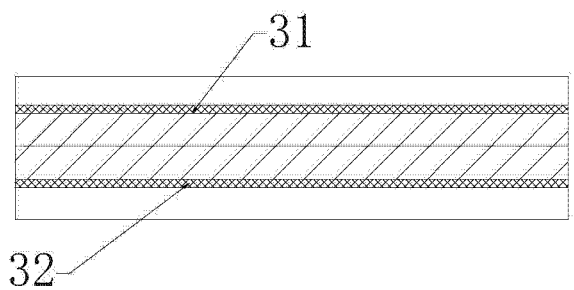

As shown in FIG. 3, the moving electrode is formed by a bracket 33, which has an H-shaped cross section, and two strips, which are horizontally placed on the two surfaces, i.e. the upside surface and the downside surface, of the middle web plate of the H-shaped bracket 33 respectively and have a cross section in the shape of rectangle, the two strips form a first working plane 31 and a second working plane 32 respectively, wherein the H-shaped bracket 33 is made of an insulating material, therefore, an upper electrode and a lower electrode mutually insulated electrode are fanned on the H-shaped bracket 33, meanwhile, there are two sets of power supplies, the strip located above the middle web plate of the H-shaped bracket 33 and fanning the first working plane 31, and the first electrode are connected with the negative electrode and positive electrode of one set of the power supplies respectively the strip located below the middle web plate of the H-shaped bracket 33 and forming the second working plane 32, and the bottom plate 21 are connected with the negative electrode and positive electrode of the other set of power supply respectively therefore, an upper ion or electron bombardment loop and a lower ion or electron bombardment loop, which are independent of each other and used for degassing the upper glass pane and the lower glass pane in the two adjacent glass panes respectively, are formed.

In addition, there may also be one set of power supply, the strips above and below the middle web plate of the H-shaped bracket of the moving electrode are connected with the negative electrode of the power supply, and the first and second electrodes are connected with the positive electrode of the power supply.

In addition, the two strips forming the first working plane 31 and the second working plane 32 may also have a cross section in the shape of round, triangle, regular polygons or irregular polygons.

Two grooves in which the two strip-shaped plates on the H-shaped bracket 33 are located are both deep grooves, and two sidewalls of each deep groove form shielding and guidance for the ion or electron stream generated during the working of the first working plane 31 or the second working plane 32 of the strip in this groove.

The H-shaped bracket 33 is movably mounted, via sliding bases 34 at the two ends thereof, on two guide rails 35 arranged inside the vacuum box body 10, and is driven by a drive mechanism 36 to move along the guide rails 35, the sliding bases 34 and the H-shaped bracket 33 may be formed integrally or formed in a splitting way at first and then fixedly connected with each other, the drive mechanism 36 is a motor-driven chain/sprocket type drive mechanism, the chain is in a ring shape supported by two sprockets at the two ends, the sprocket at one end is driven to rotate by the motor, and the sliding bases 34 are fixedly connected to the chain plate of the chain.

The two guide rails 35 extend in a direction parallel to the conveyance direction of the roller conveyance mechanism 60, the drive mechanism of the H-shaped bracket 33 is a motor-driven chain/sprocket type drive mechanism, a ring-shaped chain, two ends of which are supported by two sprockets, is arranged at the outer side of the two guide rails in a mirroring way, and the sprockets of the two ring-shaped chains, which are located at the same side, are fixedly connected by a shaft rod and driven to rotate by the motor.

In addition, the drive mechanism of the H-shaped bracket 33 may also be a synchronous toothed belt or belt pulley. The two guide rails 35 may also extend in a direction perpendicular to the conveyance direction of the roller conveyance mechanism 60.

In addition, the drive mechanism 36 may also be a motor-driven gear/rack drive mechanism, the racks are fixedly arranged in the vacuum box body 10, and the gears are mounted on the sliding bases 34 and driven to rotate by the motor. The drive mechanism 36 may also be a motor-driven nut/screw type drive mechanism, the nuts are fixed on the sliding bases 34, and the screws are rotatably mounted in the vacuum box body 10 and are driven to rotate by the motor.

Figure 4:
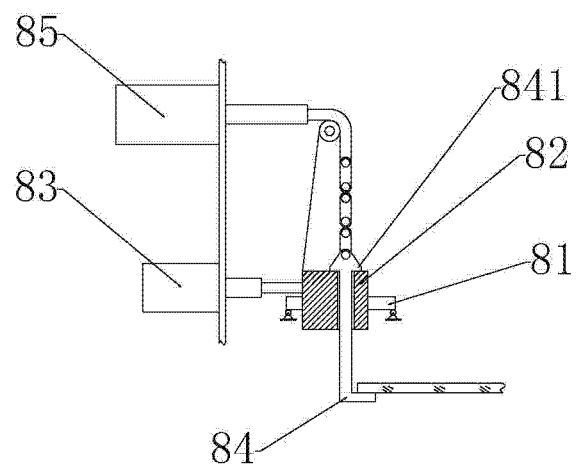
FIG. 4 is a schematic diagram illustrating the lifting unit in embodiment 1.
Figure 5:
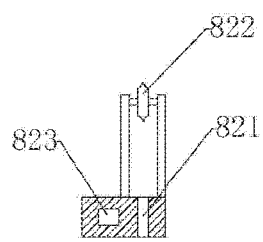
FIG. 5 is a schematic diagram illustrating the sliding base of the lifting mechanism in embodiment 1.

As shown in FIG. 4 and FIG. 5, the lifting mechanism 50 is composed of a plurality of lifting units 80 which surround a glass pane to be lifted and are arranged at intervals, the lifting unit 80 comprises a sliding rail 81, a sliding base 82, a sliding base drive device 83, a hook 84 and a hook drive device 85, therein the sliding rail 81 is fixedly arranged in the vacuum box body 10, the sliding base 82 is mounted on the sliding rail 81, a vertical guide hole 821 is arranged on the sliding base 82, the hook 84 comprises a rod body and a hook lip at the lower end of the rod body, the hook 84 is inserted into the guide hole 821 in such a manner that the rod body of the hook 84 is matched with the guide hole 821, and the upper end of the rod body of the hook 84 is connected with the hook drive device 85. The hook 84 is driven by the hook drive device 85 to move up and down along the guide hole 821, so as to lift up and put down the upper glass pane in the two adjacent glass panes stacked on the glass pane carrying device 20, the sliding base 82 is driven by the sliding base drive device 83 to reciprocate along the guide rail 81, so as to insert the hook tip into and enable the book tip to retreat from the gap between the two adjacent glass panes.

The sliding base drive device 83 and the hook drive device 85 are both formed by a hydraulic cylinder or an air cylinder, the piston rod of the hydraulic cylinder or the air cylinder stretches into the vacuum box body 10, the body of the hydraulic cylinder or the air cylinder is airtightly fixed on the sidewall of the vacuum box body 10 through the end where the piston rod is located, wherein the piston rod of the hydraulic cylinder or the air cylinder serving as the hook drive device 85 is connected with the upper end of the rod body of the hook 84 via a chain, and correspondingly, a sprocket 822 for supporting the chain and a through hole 823 matched with the sliding rail 81 are arranged on the sliding base 82.

A limit platform 841 for limiting the maximal falling position of the hook 84 is arranged on the upper end of the rod body of the hook 84.

During the working of the glass pane bombardment degassing device, the inlet 11 of the vacuum box body 10 is opened, the roller conveyance mechanism 60 conveys the glass pane carrying device 20, which carries a plurality of glass panes, into the vacuum box body 10, and after the glass pane carrying device 20 enters a working position, the electrical connection plate 22 on the glass pane carrying device 20, which is communicated with the bottom plate 21, is in sliding connection with the conductive tip 70 formed by the conductive brush.

The inlet 11 of the vacuum box body 10 is closed, the piston rod of the hook drive device 85 stretches out, the hook 84 is put down until the hook 84 is located between the first glass pane and the second glass pane from top to bottom, the piston rod of the sliding base drive device 83 stretches out to insert the hook 84 into the position below the first glass pane, afterwards, the piston rod of the hook drive device 85 is withdrawn to lift up the first glass pane to the position above the moving electrode by the hook 84.

The two sets of power supplies are switched on, the moving electrode enters the position between the first glass pane and the second glass pane along the guide rails 35 under the driving of the drive mechanism 36, and ion or electron bombardment degassing is performed on the lower surface of the first glass pane and the upper surface of the second glass pane respectively by two ion streams of the bombardment device 30.

For the vacuum glass formed by a plurality of glass substrates, the hook drive device 85 puts down the first glass pane via the hook 84 and the piston rod of the sliding base drive device 83 is withdrawn after the degassing performed on the first and second glass panes is completed, the hook 84 is caused to get away from the position below the first glass pane and the piston rod of the hook drive device 85 further stretches out, the hook 84 is further put down to reach the height between the second glass pane and the third glass pane, the sliding base drive device 83 inserts the hook 84, by the sliding base 82, to the position below the second glass pane, the piston rod of the hook drive device 85 is withdrawn, meanwhile, the first and second glass panes are lifted above the moving electrode, and the bombardment device 30 performs bombardment degassing on the lower surface of the second glass pane and the upper surface of the third glass pane.

Similarly, the above-mentioned operations are repeated until the degassing on all the glass panes is completed. The power supplies are switched off, the outlet 12 of the vacuum box body 10 is opened, the roller conveyance mechanism 60 conveys the glass pane carrying device 20, which carries the plurality of glass panes, out of the vacuum box body 10, and the plurality of glass panes are subjected to the next processing procedure.

Embodiment 2

Figure 6:
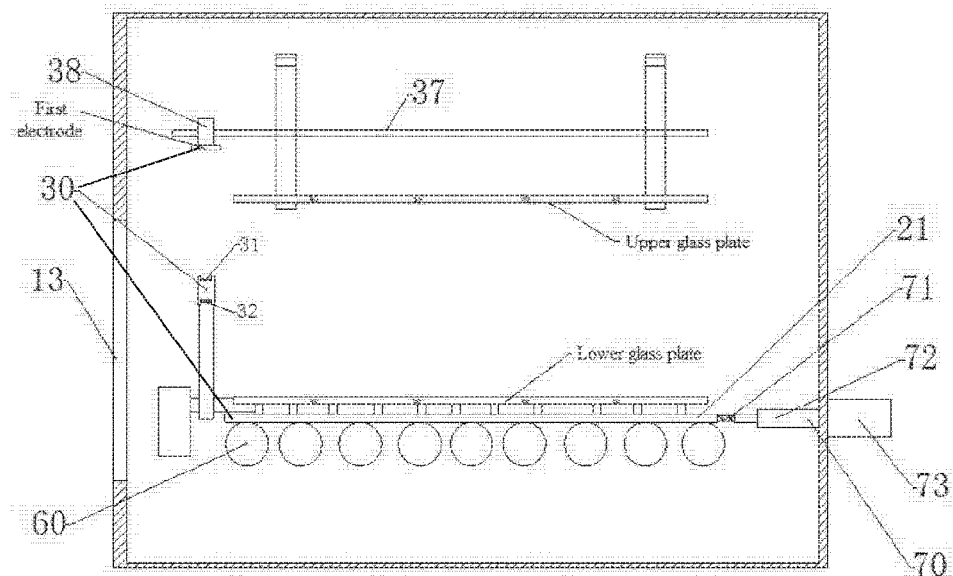
FIG. 6 is a schematic diagram of the structure of the glass pane bombardment degassing device in embodiment 2 of the present invention.
Figure 7:
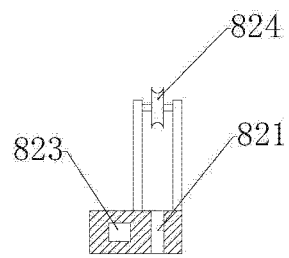
FIG. 7 is a schematic diagram of the sliding base in embodiment 2.
Figure 8:
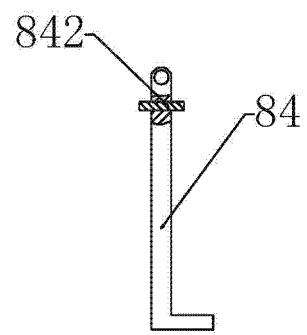
FIG. 8 is a schematic diagram of the hook in embodiment 2.

As shown in FIG. 6 to FIG. 8, the glass pane bombardment degassing device in specific embodiment 2 of the present invention differs from that in embodiment 1 in the following aspects:

1) The first electrode is a strip-shaped plane, which is arranged in the vacuum box body and is matched with and moves along with the moving electrode. The first electrode is arranged on an electrode sliding base 38, and the electrode sliding base 38 can slide along a guide rail 37 under the driving of an electrode sliding base drive device.

Figure 9:
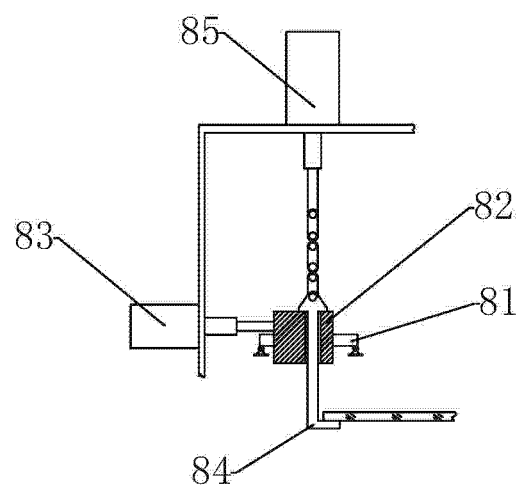
FIG. 9 is a schematic diagram of the hook drive device arranged on the top of the vacuum box body in embodiment 2.

2) The piston rod of the hydraulic cylinder or the air cylinder of the hook drive device 85 is connected with the upper end of the rod body of the hook 84 via a rope, and correspondingly, a pulley 824 for supporting the rope is arranged on the sliding base 82, as shown in FIG. 7. In addition, as shown in FIG. 9, the hook drive device 85 is arranged on the top of the vacuum box body 10, and correspondingly, the piston rod is directly connected with the upper end of the rod body of the hook 84 via a rope or a chain.

3) As shown in FIG. 8, a limit pin 842 for limiting the maximal falling position of the hook 84 is arranged on the tipper end of the rod body of the hook 84, and the limit pin 842 is in transition fit or clearance fit with a corresponding pinhole on the upper end of the rod body of the hook 84.

4) For the bombardment device 30, there is only one set of power supply, which supplies power to the first electrode, the second electrode and the moving electrode; the first electrode and the first working plane 31 of the moving electrode as well as the second electrode (i.e. the bottom plate 21) and the second working plane 32 of the moving electrode can work at the same time to degas the upper layer glass and the lower layer glass, and can also work alternatively to degas the upper layer glass and the lower layer glass respectively.

5) As shown in FIG. 6, the conductive tip 70 of the bottom plate 21, which is electrically connected with the positive electrode of the power supply, is a telescopic connection tip and comprises a connection tip body 71 communicated with the positive electrode of the power supply, a connection rod 72, and a hydraulic cylinder or air cylinder 73.

6) The inlet/outlet 13 of the glass pane carrying device is arranged on the vacuum box body 10, and the conveyance mechanism inside the vacuum box body 10 is a push rod, a push-pull rod or a gantry hook.

7) The plurality of glass panes are two glass panes forming a vacuum glass.

Before the vacuum glass is sealed, the glass pane bombardment degassing device in the present invention can remove, by means of ion or electron bombardment, the gas molecules which are adsorbed on the surface of a glass pane, in order to avoid vacuum degree degradation of vacuum inter layers caused by the escape of the gas molecules after the vacuum glass sealed, as a result, the service life of the vacuum glass is prolonged.

The invention claimed is:

1. A glass pane bombardment degassing device; comprising:
   a vacuum box body;
   a glass pane carrying device having;
   an inlet and an outlet arranged on the vacuum box body for the glass pane carrying device to enter or exit the vacuum box body;
   a bottom plate arranged on the glass pane carrying device to stack a plurality of glass panes, the bottom plate being electrically conductive, every two adjacent stacked glass panes being separated from each other via a spacer; and
   a bombardment device placed inside the vacuum box body, wherein the bombardment device comprises:
   a first and a second electrodes arranged in an up-and-down opposite way, the first and second electrodes being connected with a positive electrode of a power supply;
   a moving electrode movably arranged between the first and second electrodes, the moving electrode being connected with a negative electrode of the power supply to generate ion or electron streams between the moving electrode and the first electrode and between the moving electrode and the second electrode respectively, the ion or electron streams performing bombardment degassing to a lower surface of a first glass pane located between the moving electrode and the first electrode and to an upper surface of a second glass pane located between the moving electrode and the second electrode, the first and second glass panes are two adjacent stacked glass panes, and a movement of the moving electrode causing the ion or electron streams to sweep across and degas the entire lower surface of the first glass pane and the entire upper surface of the second glass pane.

2. The glass pane bombardment degassing device according to claim 1, wherein the plurality of glass panes are at least two glass substrates forming a multi-chamber vacuum glass.

3. The glass pane bombardment degassing device according to claim 1, wherein the bombardment device further comprises:
   a first strip-shaped electrode plane matching with the first electrode and a second strip-shaped electrode plane matching with the second electrode, the first and second strip-shaped electrode planes being arranged on the moving electrode to form ribbon-shaped ion or electron streams throughout a full length of the first and second strip-shaped electrode planes during operation to degas the first and second glass panes,
   wherein:
   the first strip-shaped electrode plane is a flat plane compatible with a to-be-degassed surface of the first glass pane or is a strip-shaped plane matching with and moving with the moving electrode;
   the second electrode is formed by the bottom plate on the glass pane carrying device; and
   a conductive tip electrically connects the bottom plate with the positive electrode of the power supply, the conductive tip comprising a conductive brush in sliding connection with an electrical connection plate on the glass pane carrying device or comprising a telescopic connection tip.

4. The glass pane bombardment degassing device according to claim 3, wherein the vacuum box body further includes:
   a conveyance device to convey the glass pane car device into and out of the vacuum box body; and
   a lifting device to lift the first glass pane, which is an upper one of the two adjacent glass panes stacked on the glass pane carrying device, to a position between the moving electrode and the first electrode of the bombardment device, wherein the second glass pane, which is a lower one of the two adjacent glass panes, is located between the moving electrode and the second electrode of the bombardment device,
   wherein:
   the conveyance device includes a roller conveyor, and
   the glass pane carrying device includes a base and is supported on the roller conveyor via the base.

5. The glass pane bombardment degassing device according to claim 4, wherein the inlet and the outlet arranged on the vacuum box body are located at two ends of the roller conveyor respectively.

6. The glass pane bombardment degassing device according to claim 4, wherein the base of the glass pane carrying device is formed by the bottom plate.

7. The glass pane bombardment degassing device according to claim 4, wherein:
the lifting device includes of a plurality of lifting units surrounding a glass pane to be lifted and are arranged at intervals; each lifting unit including a sliding rail, a sliding base, a sliding base drive device, a hook, and a hook drive device;
the sliding rail is fixedly arranged in the vacuum box body;
the sliding base is mounted on the sliding rail, a vertical guide hole being arranged on the sliding base;
the hook comprises a rod body and a hook tip at the lower end of the rod body, the hook being inserted into the guide hole, the rod body of the hook being matched with the guide hole, and the upper end of the rod body of the hook being connected with the hook drive device;
the hook is driven by the hook drive device to lift up and put down the upper glass pane in the two adjacent glass panes; and
the sliding base is driven by the sliding base drive device to reciprocate along the guide rail to insert the hook tip into and withdraw the hook tip from a gap between the two adjacent glass panes.

8. The glass pane bombardment degassing device according to claim 7, wherein:
the sliding base drive device and the hook drive device are both formed by a hydraulic cylinder or an air cylinder;
the piston rod of the hydraulic cylinder or the air cylinder stretches into the vacuum box body;
the body of the hydraulic cylinder or the air cylinder is air tightly fixed on the sidewall of the vacuum box body through the end where the piston rod is located, the piston rod of the hydraulic cylinder or the air cylinder serving as the hook drive device being connected with the upper end of the rod body of the hook via a chain, and correspondingly, a sprocket for supporting the chain being arranged on the sliding base.

9. The glass pane bombardment degassing device according to claim 8, wherein the sliding base drive device and the hook drive device are electric push rods.

10. The glass pane bombardment degassing device according to claim 8, wherein:
the piston rod of the hydraulic cylinder or the air cylinder forming the hook drive device is connected with the upper end of the rod body of the hook via a rope; and correspondingly, a pulley for supporting the rope is arranged on the sliding base.

11. The glass pane bombardment degassing device according to claim 10, wherein:
a limit platform or a limit pin arranged on the upper end of the rod body of the hook limits the maximal falling position of the hook; and
at the maximal falling position, the hook is exactly located at the height between the upper one of the two adjacent glass panes and the lower one of the two adjacent glass panes to facilitate stretching of the hook into a bottom of the lower one of the two adjacent glass panes under the driving of the sliding base drive device.

12. The glass pane bombardment degassing device according to claim 3, wherein:
the moving electrode is formed by a H-shaped bracket having an H-shaped cross section;
a first strip and a second strip, which are horizontally placed on an upside surface and a downside surface of a middle web plate of the H-shaped bracket respectively, have a cross section in a shape of round, rectangle, triangle, square, or other polygons; and
the H-shaped bracket is made of an insulating material to facilitate forming an upper electrode and a lower electrode mutually insulated on the H-shaped bracket.

13. The glass pane bombardment degassing device according to claim 12, wherein:
the first strip, located above the middle web plate of the H-shaped bracket, and the first electrode are connected with a negative electrode and a positive electrode of a first power supply respectively; and
the second strip, located below the middle web plate of the H-shaped bracket, and the second electrode are connected with a negative electrode and a positive electrode of a second power supply respectively, to form an upper ion or electron bombardment loop and a lower ion or electron bombardment loop, which are independent of each other and degas the upper glass pane and the lower glass pane in the two adjacent glass panes respectively.

14. The glass pane bombardment degassing device according to claim 12, wherein:
the first and second strips above and below the middle web plate of the H-shaped bracket of the moving electrode are connected with the negative electrode of a power supply; and
the first and second electrodes are connected with the positive electrode of the power supply.

15. The glass pane bombardment degassing device according to claim 12, wherein:
two grooves in which the first and second strips on the H-shaped bracket are located are both deep grooves; and
two sidewalls of each of the deep grooves form shielding and guidance for ion or electron stream generated during operation of the first or second strip located in the deep groove.

16. The glass pane bombardment degassing device according to claim 12, wherein:
the H-shaped bracket is movably mounted, via sliding bases at its two ends, on two guide rails arranged inside the vacuum box body, and is driven by a drive mechanism to move along the guide rails; and
the drive mechanism is at least one of:
a motor-driven gear-rack type drive mechanism, the racks being fixedly arranged in the vacuum box body, and the gears being mounted on the sliding bases and driven to rotate by the motor;
a motor-driven nut-screw type drive mechanism, nuts of the drive mechanism being fixed on the sliding bases, and screws of the drive mechanism being rotatably mounted in the vacuum box body and driven to rotate by the motor; or
a motor-driven chain-sprocket type drive mechanism, wherein a chain of the drive mechanism is in a ring shape supported by two sprockets at its two ends, a sprocket of the drive mechanism at one end is driven by the motor to rotate, and the sliding bases are fixedly connected to a chain plate of the chain via connection plates.

17. The glass pane bombardment degassing device according to claim 16, wherein:
the two guide rails extend in a direction parallel to or perpendicular to a conveyance direction of the roller conveyor;
the drive mechanism of the H-shaped bracket is a motor-driven chain-sprocket type drive mechanism;
each of two ring-shaped chains; two ends of which are supported by two sprockets, is arranged at an outer side of each of the two guide rails in a mirroring way; and
sprockets of the two ring-shaped chains, located at the same side, are fixedly connected by a shaft rod and driven by the motor to rotate.

18. The glass pane bombardment degassing device according to claim 1, wherein the first electrode is formed by a conductive flat plate.

19. The glass pane bombardment degassing device according to claim 1, wherein the bottom plate on the glass pane carrying device is formed by a conductive flat plate.

20. The glass pane bombardment degassing device according to claim 1, wherein:
a travel distance of the moving electrode can be set according to a size of a glass pane to be degassed and a functioning range of bombardment degassing of the moving electrode is limited to a desired area; and
a length of the moving electrode can be adjusted or shaded as needed.

* * * * *